United States Patent
Guo et al.

(10) Patent No.: US 11,616,371 B2
(45) Date of Patent: Mar. 28, 2023

(54) METHOD FOR CALCULATING PARAMETER CHANGING DOMAIN OF LOADS UNDER A CASE THAT GUARANTEES CONSTANT LOCATIONAL MARGINAL PRICE IN ELECTRICITY MARKET

(71) Applicants: TSINGHUA UNIVERSITY, Beijing (CN); STATE GRID FUJIAN ELECTRIC POWER RESEARCH INSTITUTE, Fujian (CN)

(72) Inventors: Qinglai Guo, Beijing (CN); Hongbin Sun, Beijing (CN); Nianfeng Tian, Beijing (CN); Wenchuan Wu, Beijing (CN); Bin Chen, Fujian (CN); Jianye Huang, Fujian (CN)

(73) Assignees: STATE GRID FUJIAN ELECTRIC POWER RESEARCH INSTITUTE, Fuzhou (CN); TSINGHUA UNIVERSITY, Beijing (CN)

( * ) Notice: Subject to any disclaimer, the term of this patent is extended or adjusted under 35 U.S.C. 154(b) by 65 days.

(21) Appl. No.: 17/328,373

(22) Filed: May 24, 2021

(65) Prior Publication Data
US 2022/0060028 A1 Feb. 24, 2022

(30) Foreign Application Priority Data
Aug. 20, 2020 (CN) .......................... 202010841616.7

(51) Int. Cl.
*H02J 3/46* (2006.01)
*G06Q 50/06* (2012.01)
*H02J 3/38* (2006.01)

(52) U.S. Cl.
CPC .............. *H02J 3/466* (2020.01); *G06Q 50/06* (2013.01); *H02J 3/381* (2013.01); *H02J 2203/20* (2020.01)

(58) Field of Classification Search
CPC ........ H02J 3/466; H02J 3/381; H02J 2203/20; H02J 3/00; H02J 3/008; G06Q 50/06; Y02E 60/00; Y04S 40/20; Y04S 50/10; G06F 30/20; G06F 2111/04
See application file for complete search history.

(56) References Cited

FOREIGN PATENT DOCUMENTS

CN 108921595 A * 11/2018 ......... G06Q 30/0206

OTHER PUBLICATIONS

C. Ruiz and A. J. Conejo, "Pool Strategy of a Producer With Endogenous Formation of Locational Marginal Prices," in IEEE Transactions on Power Systems, vol. 24, No. 4, pp. 1855-1866, Nov. 2009, [online], [retrieved online Sep. 9, 2022], doi: 10.1109/TPWRS.2009.2030378 (Year: 2009).*

* cited by examiner

*Primary Examiner* — Chun Cao
*Assistant Examiner* — Charles Cai
(74) *Attorney, Agent, or Firm* — Hodgson Russ LLP

(57) ABSTRACT

The disclosure provides a method for calculating a parameter changing domain of loads under a case that guarantees a constant locational marginal price in an electricity market, which relates to the electricity market field of the power system. With the method in the disclosure, the clearing model on the locational marginal price in the general form is established, and the safe changing domain of the locational marginal price with respect to the loads may be derived and calculated based on the first-order KKT condition expansion of the clearing model on the locational marginal price in the general form. When the increment of the nodal loads is subordinate to the changing domain, the locational marginal price may remain unchanged. The parameter changing domain of loads in the power system may be used for the comprehensive evaluation of power market clearing results and assisting the operation of the power market.

1 Claim, No Drawings

METHOD FOR CALCULATING PARAMETER CHANGING DOMAIN OF LOADS UNDER A CASE THAT GUARANTEES CONSTANT LOCATIONAL MARGINAL PRICE IN ELECTRICITY MARKET

CROSS-REFERENCE TO RELATED APPLICATION

This application claims priority to Chinese Patent Application No. 202010841616.7, filed Aug. 20, 2020, the entire disclosure of which is incorporated by reference herein

TECHNICAL FIELD

The disclosure relates to the electricity market field of the power system, and more particularly to a method for calculating a parameter changing domain of loads under a case that guarantees a constant locational marginal price in an electricity market.

BACKGROUND

With the continuous development of electricity market theory and application, an economic dispatch model based on optimal power flow has been widely applied in the electricity market clearing. The locational marginal price based on the economic dispatch model has become a mainstream tool in the electricity market. However, with the increasing penetration rate of renewable energy access and the popularization of electric vehicles, the power system is increasingly likely to operate under extreme conditions, causing system congestion and making the locational marginal price vulnerable to various factors, especially to nodal loads. In this context, it is greatly significant to the safe and economic operation of the power system that the impact of the nodal loads on the locational marginal price is evaluated and a parameter changing domain of loads is determined under an operation base state to guarantee a constant locational marginal price. It is the basis for market information risk identification, market power analysis, congestion management, and adjustment of operation modes.

SUMMARY

The disclosure aims to provide a method for calculating a parameter changing domain of loads under a case that guarantees a constant locational marginal price in an electricity market, based on a locational marginal price clearing model in a current electricity market. The parameter changing domain of different nodal loads under a clearing base state in the current electricity market may be calculated quickly. When an increment of the nodal loads is subordinate to the changing domain, the locational marginal price may remain unchanged.

The method for calculating the parameter changing domain of loads in the power system under the case that guarantees the constant locational marginal price in the electricity market, provided in the disclosure, may include the following.

(1) A clearing model on the locational marginal price in a general form is established, which has the following specific process.

(1-1) The clearing model on the locational marginal price is established as follows:

where, $$\min_{p_l} \sum_{i=1}^{Ng} c_i p_i$$

satisfying: $\sum_{i=1}^{Ng} p_i = \sum_{j=1}^{N} D_j$ $P_i^{min} \le p_i \le P_i^{max}, \forall i \in N_g$ $-F_l^{max} \le \sum_{i=1}^{Ng} S_{i,l} p_i - \sum_{j=1}^{N} S_{i,j} D_j \le F_l^{max}, \forall l \in \mathcal{L},$ where, $N_g$ represents a number of generator nodes in the power system;

$\mathcal{N}_g$ represents a set of serial numbers of the generator nodes, $\mathcal{N}_g \triangleq \{1, 2, \ldots, N_g\}$;

N represents a total number of nodes in the power system;

$\mathcal{L}$ represents a set of serial numbers of branches in the power system, $\mathcal{L} \triangleq \{1, 2, \ldots, L\}$, L represents a total number of the branches in the power system;

$p_i$, $i \in \mathcal{N}_g$ represents a power variable of generator i;

$c_i$, $i \in \mathcal{N}_g$ represents a power cost coefficient of generator i;

$P_i^{max}$ represents an upper power limit of the generator node;

$P_i^{min}$ represents a lower power limit of the generator node;

$D_j$, $j \in \{1, 2, \ldots, N\}$ represents a nodal load of the power system;

$F_l^{max}$, $l \in \mathcal{L}$ represents a capacity of branch l; and $S_{l,i}$, $l \in \mathcal{L}$, $i \in \{1, 2, \ldots, N\}$ represents a power transfer distribution factor.

There is the following linear relationship between locational marginal prices and Lagrangian multipliers of constraints:

$$\Lambda = \tau - S_{LN}^T(\mu^{L, max} - \mu^{L, min})$$

where, $\Lambda$ represents a column vector including locational marginal prices of the nodes in the power system in an order of serial numbers of the nodes;

$\tau$ represents a Lagrangian multiplier for the power balance constraint $$\sum_{i=1}^{Ng} p_i = \sum_{i=1}^{N} D_i$$

$\mu^{L,max}$ represents a column vector including Lagrangian multipliers for the upper bound constrains $$\sum_{i=1}^{Ng} S_{l,i} p_i - \sum_{i=1}^{N} S_{l,i} D_i \le F_l^{max}$$

in the power system in an order of serial numbers of the branches;

$\mu^{L,min}$ represents a column vector including Lagrangian multipliers for the lower bound constraint $$-F_l^{max} \le \sum_{i=1}^{Ng} S_{l,i} p_i - \sum_{i=1}^{N} S_{l,i} D_i$$

in the power system in an order of serial numbers of the branches;

$S_{LN}$ represents a power transfer distribution factor matrix; and

T represents a matrix transpose.

(1-2) Let a variable $p'_i = p_i - P_i^{min}$ to transform a decision variable $p_i$ of the clearing model into a pure non-negative variable $p'_i$, and slack variables $p_i^{sl}$, $f_l^{sl,min}$, $f_l^{sl,max}$ are introduced to transform the clearing model into a linear programming in a general form as follows:

$$\min_{p_i} \sum_{i=1}^{Ng} c_i p'_i$$

satisfying: $\sum_{j=1}^{Ng} p'_j = \sum_{i=1}^{N} D_i - \sum_{i=1}^{Ng} P_i^{min}$ $p'_i + p_i^{sl} = P_i^{max} - P_i^{min}, \forall i \in N_g$ $-F_l^{max} = \sum_{i=1}^{Ng} S_{l,i} p'_i + \sum_{i=1}^{Ng} S_{l,i} P_i^{min} - \sum_{i=1}^{N} S_{l,i} D_i - f_l^{sl,min}, \forall l \in \mathcal{L}.$ $\sum_{i=1}^{Ng} S_{l,i} p'_i + \sum_{i=1}^{Ng} S_{l,i} P_i^{min} - \sum_{i=1}^{N} S_{l,i} D_i + f_l^{sl,max} = F_l^{max}, \forall l \in \mathcal{L}$ $p'_i, p_i^{sl}, f_l^{sl,min}, f_l^{sl,max} \geq 0$ (1-3) The clearing model obtained in (1-2) is simplified into the linear programming in the general form, as follows:

$$\min_x \sum c \cdot x$$

satisfying: $A \cdot x = b$ $x \geq 0$ where, matrix A and vectors c, b correspond to parameters of the clearing model as follows:

$$A = \begin{bmatrix} e_G \\ I_G & I_G \\ S_{LG} & & -I_L \\ S_{LG} & & & I_L \end{bmatrix},$$

$$x = \begin{bmatrix} p' \\ p^{sl} \\ f^{sl,min} \\ f^{sl,max} \end{bmatrix},$$

$$b = \begin{bmatrix} e_D D - e_G P^{min} \\ P^{max} - P^{min} \\ S_{LN} D - S_{LG} P^{min} - F^{max} \\ S_{LN} D - S_{LG} P^{min} + F^{max} \end{bmatrix},$$

$c = [\, c^T \quad 0 \quad 0 \quad 0\,]$ where, $e_G$ is a matrix whose elements of dimension $1 \times N_g$ are all 1;

$e_D$ is a matrix whose elements of dimension $1 \times N$ are all 1;

$I_G$ is a unit matrix with dimension $N_g \times N_g$;

$I_L$ is a unit matrix with dimension $L \times L$;

$S_{LG}$ is a sub-matrix formed by columns corresponding to the generator nodes.

(2) The parameter changing domain of loads under the case that guarantees the constant locational marginal price is derived and calculated based on a first-order KKT condition of the clearing model in (1-3) in the general form.

(2-1) The first-order KKT condition in an incremental form may be derived as follows:

$$\begin{cases} A \cdot x^* = b \\ x^* \geq 0 \\ A^T \cdot \omega + r = c^T, r \geq 0 \\ r^T \cdot x^* = 0 \end{cases},$$

where, $\omega$ is a Lagrangian multiplier vector of the constraint condition $A \cdot x = b$;

r is a Lagrangian multiplier vector of the constraint condition $x \geq 0$;

c, b are independent variables in the KKT condition;

$\omega$, r, $x^*$ are dependent variables in the KKT condition.

It is supposed that in a base state $c = c_0$ and $b = b_0$, the dependent variables in the KKT condition may be $\omega = \omega_0$, $r = r_0$, $x^* = x^*_0$.

In order to ensure that the dependent variables $\omega$, r remain unchanged after the independent variable b is superimposed by $\Delta b$, it is necessary to ensure that when the independent variables become $c = c_0$ and $b = b_0 + \Delta b$, the dependent variables in the KKT condition satisfy the following form: $\omega = \omega_0$, $r = r_0$, $x - = x^*_0 + \Delta x^*$.

Therefore, in the base state $c = c_0$, and $b = b_0$, the KKT condition is as follows:

$$\begin{cases} A \cdot x^*_0 = b_0 \\ x^*_0 \geq 0 \\ A^T \cdot \omega_0 + r_0 = c^T, r \geq 0 \\ r_0^T x^*_0 = 0 \end{cases}.$$

When the independent variables change in the base state, the KKT condition is as follows:

$$\begin{cases} A \cdot (x^*_0 + \Delta x^*) = b_0 + \Delta b \\ x^*_0 + \Delta x \geq 0 \\ A^T \cdot \omega_0 + r_0 = c^T, r \geq 0 \\ r_0^T (x^*_0 + \Delta x^*) = 0 \end{cases}.$$

The expansion equation of the first-order KKT condition in the incremental form may be derived from the above equation as follows:

$$\begin{cases} A \cdot \Delta x^* = \Delta b \\ r_0^T \cdot \Delta x^* = 0 \\ x_0 \cdot \Delta x^* \geq 0 \end{cases}.$$

(2-2) A projection matrix is designed to derive the parameter changing domain of loads under the case that guarantees the constant locational marginal price:

The projection matrix P of an equation $r_0^T \cdot \Delta x^* = 0$ is defined as follows:

$P = I - r_0 \cdot (r_0^T \cdot r_0)^{-1} \cdot r_0^T$

The expansion equation of the first-order KKT condition in the incremental form may be transformed into the parameter changing domain of loads under the case that guarantees the constant locational marginal price as follows:

$$S \triangleq \{A \cdot P \cdot \Delta y | x^* + P\Delta y \geq 0, P = I - r_0 \cdot (r_0^T \cdot r_0)^{-1} \cdot r_0^T, \Delta t \in R^n\}.$$

The method for calculating the parameter changing domain of loads in the power system under the case that guarantees the constant locational marginal price in the electricity market, provided in the disclosure, may have the following advantages.

With the method for calculating the parameter changing domain of loads in the power system under the case that guarantees the constant locational marginal price in the electricity market, the clearing model on the locational marginal price in the general form is established, and the safe changing domain of the locational marginal price with respect to the loads may be derived and calculated based on the first-order KKT condition expansion of the clearing model on the locational marginal price in the general form. The method may quickly calculate the parameter changing domain of different nodal loads under the condition of a clear base state in the current power market. When the increment of the nodal loads is subordinate to the changing domain, the locational marginal price may remain unchanged. The parameter changing domain of loads in the power system, calculated by the method of the disclosure may be used for the comprehensive evaluation of power market clearing results and assisting the operation of the power market.

DETAILED DESCRIPTION

The method for calculating the parameter changing domain of loads in the power system under the case that guarantees the constant locational marginal price in the electricity market, provided in the disclosure, may include the following.

(1) A clearing model on the locational marginal price in a general form is established, which has the following specific process.

(1-1) The clearing model on the locational marginal price is established as follows:

$$\min_{p_i} \sum_{i=1}^{Ng} c_i p_i$$

$$\text{satisfying: } \sum_{i=1}^{Ng} p_i = \sum_{j=1}^{N} D_j$$

$$P_i^{min} \leq p_i \leq P_i^{max}, \forall i \in \mathcal{N}_g$$

$$-F_l^{max} \leq \sum_{i=1}^{Ng} S_{l,i} p_i = \sum_{j=1}^{N} S_{l,j} D_j \leq F_l^{max}, \forall l \in \mathcal{L},$$

where, $N_g$ represents a number of generator nodes in the power system;

$\mathcal{N}_g$ represents a set of serial numbers of the generator nodes, $\mathcal{N}_g \triangleq \{1, 2, \ldots, N_g\}$;

N represents a total number of nodes in the power system;

$\mathcal{L}$ represents a set of serial numbers of branches in the power system, $\mathcal{L} \triangleq \{1, 2, \ldots, L\}$, L represents a total number of the branches in the power system;

$p_i$, $i \in \mathcal{N}_g$ represents a power variable of generator i and $c_i$, $i \in \mathcal{N}_g$ represents a power cost coefficient of generator i, which are declared and confirmed by the main body of each generator to the relevant power agencies.

$P_i^{max}$ represents an upper power limit of the generator node;

$P_i^{min}$ represents a lower power limit of the generator node;

$D_j$, $j \in \{1, 2, \ldots, N\}$ represents a nodal load of the power system;

$F_l^{max}$, $l \in \mathcal{L}$ represents a capacity of branch l; and $S_{L,i}$, $l \in \mathcal{L}$, $i \in \{1, 2, \ldots, N\}$ represents a power transfer distribution factor, which is calculated by relevant power agencies and released upon application.

There is the following linear relationship between locational marginal prices and Lagrangian multipliers of constraints:

$$\Lambda = \tau - S_{LN}^T (\mu^{L, max} - \mu^{L, min})$$

where, $\Lambda$ represents a column vector including locational marginal prices of the nodes in the power system in an order of serial numbers of the nodes;

$\tau$ represents a Lagrangian multiplier for the power balance constraint $$\sum_{i=1}^{Ng} p_i = \sum_{i=1}^{N} D_i;$$

$\mu^{L, max}$ represents a column vector including Lagrangian multipliers for the upper bound constraint $$\sum_{i=1}^{Ng} S_{l,i} p_i - \sum_{i=1}^{N} S_{l,i} D_i \leq F_l^{max}$$

in the power system in an order of serial numbers of the branches;

$\mu^{L,min}$ represents a column vector including Lagrangian multipliers for the lower bound constraint $$-F_l^{max} \leq \sum_{i=1}^{Ng} S_{l,i} p_i - \sum_{i=1}^{N} S_{l,i} D_i$$

in the power system in an order of serial numbers of the branches;

$S_{LN}$ represents a power transfer distribution factor matrix; and

T represents a matrix transpose.

(1-2) Let a variable $p'_i = p_i - P_i^{min}$, to transform a decision variable $p_i$ of the clearing model into a pure non-negative variable $p'_i$, and slack variables $p_i^{sl}$, $f_l^{sl,min}$, $f_l^{sl,max}$ are introduced to transform the clearing model into a linear programming in a general form as follows:

$$\min_{p_i} \sum_{i=1}^{Ng} c_i p'_i$$

-continued satisfying: $\sum_{j=1}^{Ng} p'_i = \sum_{i=1}^{N} D_i - \sum_{i=1}^{Ng} P_i^{min}$ $p'_i + p_i^{sl} = P_i^{max} - P_i^{min}, \forall i \in N_g$ $-F_l^{max} = \sum_{i=1}^{Ng} S_{l,i} p'_i + \sum_{i=1}^{Ng} S_{l,i} P_i^{min} - \sum_{i=1}^{N} S_{l,i} D_i - f_l^{sl,min}, \forall l \in \mathcal{L}.$ $\sum_{i=1}^{Ng} S_{l,i} p'_i + \sum_{i=1}^{Ng} S_{l,i} P_i^{min} - \sum_{i=1}^{N} S_{l,i} D_i + f_l^{sl,max} = F_l^{max}, \forall l \in \mathcal{L}$ $p'_i, p_i^{xl}, f_l^{xl,min}, f_l^{sl,max} \geq 0$ (1-3) The clearing model obtained in (1-2) is simplified into the linear programming in the general form, as follows:

$$\min_x \sum c \cdot x$$

satisfying: $A \cdot x = b$ $x \geq 0$ where, matrix A and vectors c, b correspond to parameters of the clearing model as follows:

$$A = \begin{bmatrix} e_G & & \\ I_G & I_G & \\ S_{LG} & & -I_L \\ S_{LG} & & I_L \end{bmatrix},$$

$$x = \begin{bmatrix} p' \\ p^{sl} \\ f^{sl,min} \\ f^{sl,max} \end{bmatrix}, b = \begin{bmatrix} e_D D - e_G P^{min} \\ P^{max} - P^{min} \\ S_{LN} D - S_{LG} P^{min} - F^{max} \\ S_{LN} D - S_{LG} P^{min} + F^{max} \end{bmatrix}, c = [c^T \ 0 \ 0 \ 0]$$

where, $e_G$ is a matrix whose elements of dimension $1 \times N_g$ are all 1;

$e_D$ is a matrix whose elements of dimension $1 \times N$ are all 1;

$I_G$ is a unit matrix with dimension $N_g \times N_g$;

$I_L$ is a unit matrix with dimension $L \times L$;

$S_{LG}$ is a sub-matrix formed by columns corresponding to the generator nodes.

(2) The parameter changing domain of loads under the case that guarantees the constant locational marginal price is derived and calculated based on a first-order KKT (Karush-Kuhn-Tucker) condition of the clearing model in (1-3) in the general form, which may include the following.

(2-1) The first-order KKT condition in an incremental form may be derived as follows:

$$\begin{cases} A \cdot x^* = b \\ x^* \geq 0 \\ A^T \cdot \omega + r = c^T, r^* \geq 0 \\ r^T \cdot x^* = 0 \end{cases},$$

where, $\omega$ is a Lagrangian multiplier vector of the constraint condition $A \cdot x = b$;

r is a Lagrangian multiplier vector of the constraint condition $x \geq 0$;

c, b are independent variables in the KKT condition;

$\omega$, r, $x^*$ are dependent variables in the KKT condition.

According to the definition of the locational marginal price in the power system, it may be seen from (1-1) that the relationship between the locational marginal price and the nodal load is equivalent to the relationship between the dependent variables $\omega$, r and the independent variable b in the KKT condition. Therefore, "when the nodal load changes, the locational marginal price remains unchanged" is equivalent to "when the independent variable b changes, the dependent variables $\omega$, r remain unchanged".

It is supposed that in a base state $c=c_0$ and $b=b_0$, the dependent variables in the KKT condition may be $\omega=\omega_0$, $r=r_0$, $x^*=x_0$. In order to ensure that the dependent variables $\omega$, r remain unchanged after the independent variable b is superimposed by $\Delta b$, it is necessary to ensure that when the independent variables become $c=c_0$ and $b=b_0+\Delta b$, the dependent variables in the KKT condition satisfy the following form: $\omega=\omega_0$, $r=r_0$, $x^-=x^*_0+\Delta x^*$.

Therefore, in the base state $c=c_0$, $b=b_0$, the KKT condition is as follows:

$$\begin{cases} A \cdot x^*_0 = b_0 \\ x^*_0 \geq 0 \\ A^T \cdot \omega_0 + r_0 = c^T, r \geq 0 \\ r_0^T \cdot x^*_0 = 0 \end{cases}.$$

When the independent variables change in the base state, that is, $c=c_0$ and $b=b_0+\Delta b$, the KKT condition is as follows:

$$\begin{cases} A \cdot (x^*_0 + \Delta x^*) = b_0 + \Delta b \\ x^*_0 + \Delta x^* \geq 0 \\ A^T \cdot \omega_0 + r_0 = c^T, r_0 \geq 0 \\ r_0^T (x^*_0 + \Delta x^*) = 0 \end{cases}.$$

The expansion equation of the first-order KKT condition in the incremental form may be derived from the above equation as follows:

$$\begin{cases} A \cdot \Delta x^* = \Delta b \\ r_0^T \cdot \Delta x^* = 0 \\ x_0 + \Delta x^* \geq 0 \end{cases}.$$

(2-2) A projection matrix is designed to derive the parameter changing domain of loads under the case that guarantees the constant locational marginal price:

The projection matrix P of an equation $r_0^T \cdot \Delta x^* = 0$ is defined as follows:

$$P = I - r_0 \cdot (r_0^T \cdot r_0)^{-1} \cdot r_0^T$$

The expansion equation of the first-order KKT condition in the incremental form may be transformed into the parameter changing domain of loads under the case that guarantees the constant locational marginal price as follows:

$$S \overset{\Delta}{=} \{A \cdot P \cdot \Delta y | x^* + P \Delta y \geq 0, P = I - r_0 \cdot (r_0^T \cdot r_0)^{-1} \cdot r_0^T, \Delta t \in R^n\}.$$

The method for calculating the parameter changing domain of loads in the power system under the case that guarantees the constant locational marginal price in the electricity market, provided in the disclosure, may have the following advantages.

What is claimed is:

1. A method for calculating a parameter changing domain of loads in a power system under a case that guarantees a constant locational marginal price in an electricity market, comprising:

(1) establishing a clearing model on the constant locational marginal price in a general form, comprising:

(1-1) establishing the clearing model on the constant locational marginal price as follows:

$$\min_{p_i} \sum_{i=1}^{Ng} c_i p_i$$

satisfying: $\sum_{i=1}^{Ng} p_i = \sum_{j=1}^{N} D_j$ $P_i^{min} \leq p_i \leq P_i^{max}, \forall i \in \underline{N_g}$ $-F_l^{max} \leq \sum_{i=1}^{Ng} S_{l,i} p_i - \sum_{j=1}^{N} S_{l,j} p_j \leq F_l^{max}, \forall l \in \underline{\mathcal{L}},$ where, $N_g$ represents a number of generator nodes in the power system;

$\underline{N_g}$ represents a set of serial numbers of the generator nodes, $\underline{N_g} \triangleq \{1, 2, \ldots, N_g\}$;

N represents a total number of nodes in the power system;

$\underline{\mathcal{L}}$ represents a set of serial numbers of branches in the power system, $\underline{\mathcal{L}} \triangleq \{1, 2, \ldots, L\}$, L represents a total number of the branches in the power system;

$p_i$, $i \in \underline{N_g}$ represents a power variable of generator i;

$c_i$, $i \in \underline{N_g}$ represents a power cost coefficient of generator i;

$P_i^{max}$ represents an upper power limit of the generator node i;

$P_i^{min}$ represents a lower power limit of the generator node i;

$D_j$, $j \in \{1, 2, \ldots, N\}$ represents a nodal load of the power system;

$F_l^{max}$, $l \in \underline{\mathcal{L}}$ represents a capacity of branch l; and $S_{l,i}$, $l \in \underline{\mathcal{L}}$, $i \in \{1, 2, \ldots, N\}$ represents a power transfer distribution factor;

there is a following linear relationship between constant locational marginal prices and Lagrangian multipliers of constraints:

$\Lambda = \tau - S_{LN}^T (\mu^{L,max} - \mu^{L,min}),$ where, $\Lambda$ represents a column vector including the constant locational marginal prices of the nodes in the power system in an order of serial numbers of the nodes;

$\tau$ represents a Lagrangian multiplier for the power balance constraint $\sum_{i=1}^{Ng} p_i = \sum_{i=1}^{N} D_i;$ $\mu^{L,max}$ represents a column vector including Lagrangian multipliers for the upper bound constraint $$\sum_{i=1}^{Ng} S_{l,i} p_i - \sum_{i=1}^{N} S_{l,i} D_i \leq F_l^{max}$$

in the power system in an order of serial numbers of the branches;

$\mu^{L,min}$ represents a column vector including Lagrangian multipliers for the lower bound constraint $$-F_l^{max} \leq \sum_{i=1}^{Ng} S_{l,i} p_i - \sum_{i=1}^{N} S_{l,i} D_i$$

in the power system in an order of serial numbers of the branches;

$S_{LN}$ represents a power transfer distribution factor matrix; and

T represents a matrix transpose;

(1-2) letting a variable $p'_i = p_i - P_i^{min}$ to transform a decision variable $p_i$ of the clearing model into a pure non-negative variable $p'_i$, and introducing slack variables $p_i^{sl}$, $f_l^{sl,min}$, $f_l^{sl,max}$ to transform the clearing model into a linear programming in the general form as follows:

$$\min_{p_i} \sum_{i=1}^{Ng} c_i p'_i$$

satisfying: $\sum_{i=1}^{Ng} p'_i = \sum_{i=1}^{N} D_i - \sum_{i=1}^{Ng} P_i^{min}$ $p'_i + p_i^{sl} = P_i^{max} - P_i^{min}, \forall i \in \underline{N_g}$ $-F_l^{max} \leq \sum_{i=1}^{Ng} S_{l,i} p'_i + \sum_{i=1}^{Ng} S_{l,i} P_i^{min} - \sum_{i=1}^{N} S_{l,j} D_i - f_l^{sl,min}, \forall l \in \underline{\mathcal{L}}$ $\sum_{i=1}^{Ng} S_{l,i} p'_i + \sum_{i=1}^{Ng} S_{l,i} P_i^{min} - \sum_{i=1}^{N} S_{l,j} D_i + f_l^{sl,max} = F_l^{max}, \forall l \in \underline{\mathcal{L}}$ $p'_i, p_i^{sl}, f_l^{sl,min}, f_l^{sl,max} \geq 0;$ (1-3) simplifying the clearing model obtained in (1-2) into the linear programming in the general form, as follows:

$$\min_x \sum c \cdot x$$

satisfying: $A \cdot x = b,$ $x \geq 0$ where, matrix A and vectors c, b correspond to parameters of the clearing model as follows:

$$A = \begin{bmatrix} e_G & & \\ I_G & I_G & \\ S_{LG} & & -I_L \\ S_{LG} & & I_L \end{bmatrix},$$

$$x = \begin{bmatrix} p' \\ p^{sl} \\ f^{sl,min} \\ f^{sl,max} \end{bmatrix}, b = \begin{bmatrix} e_D D - e_G P^{min} \\ P^{max} - P^{min} \\ S_{LN} D - S_{LG} P^{min} - F^{max} \\ S_{LN} D - S_{LG} P^{min} + F^{max} \end{bmatrix}, c = [c^T \ 0 \ 0 \ 0]$$

where,
- $e_G$ is a matrix whose elements of dimension $1 \times N_g$ are all 1;
- $e_D$ is a matrix whose elements of dimension $1 \times N$ are all 1;
- $I_G$ is a unit matrix with dimension $N_g \times N_g$;
- $I_L$ is a unit matrix with dimension $L \times L$;
- $S_{LG}$ is a sub-matrix formed by columns corresponding to the generator nodes;

(2) deriving and calculating the parameter changing domain of loads under the case that guarantees the constant locational marginal price based on a first-order KKT (Karush-Kuhn-Tucker) condition of the clearing model in (1-3) in the general form, comprising:

(2-1) deriving the first-order KKT condition in an incremental form as follows:

$$\begin{cases} A \cdot x^* = b \\ x^* \geq 0 \\ A^T \cdot \omega + r = c^T, r^* \geq 0 \\ r^T \cdot x^* = 0 \end{cases}$$

where,
- ω is a Lagrangian multiplier vector of the constraint condition A·x=b;
- r is a Lagrangian multiplier vector of the constraint condition x≥0;
- c, b are independent variables in the KKT condition;
- ω, r, x* are dependent variables in the KKT condition;
- supposing that in a base state $c=c_0$ and $b=b_0$, the dependent variables in the KKT condition being $\omega=\omega_0$, $r=r_0$, $x^*=x^*_0$;

wherein in order to ensure that the dependent variables ω, r remain unchanged after the independent variable b is superimposed by Δb, it is necessary to ensure that when the independent variables become $c=c_0$ and $b=b_0+\Delta b$, the dependent variables in the KKT condition satisfy the following form: $\omega=\omega_0$, $r=r_0$, $x^*=x^*_0+\Delta x^*$;

in the base state $c=c_0$, $b=b_0$, the KKT condition is as follows:

$$\begin{cases} A \cdot x^*_0 = b_0 \\ x^*_0 \geq 0 \\ A^T \cdot \omega_0 + r_0 = c^T, r \geq 0 \\ r_0^T \cdot x^*_0 = 0 \end{cases},$$

when the independent variables change in the base state, the KKT condition is as follows:

$$\begin{cases} A \cdot (x^*_0 + \underline{\Delta x^*}) = b_0 + \underline{\Delta b} \\ x^*_0 + \underline{\Delta x^*} \geq 0 \\ A^T \cdot \omega_0 + r_0 = c^T, r_0 \geq 0 \\ r_0^T (x^*_0 + \underline{\Delta x^*}) = 0 \end{cases},$$

an expansion equation of the first-order KKT condition in the incremental form is derived from the above equation as follows:

$$\begin{cases} A \cdot \underline{\Delta x^*} = \underline{\Delta b} \\ r_0^T \cdot \underline{\Delta x^*} = 0 \ ; \\ x_0 + \underline{\Delta x^*} \geq 0 \end{cases}$$

(2-2) design a projection matrix to derive the parameter changing domain of loads under the case that guarantees the constant locational marginal price:

defining the projection matrix P of an equation $r_0^T \cdot \Delta x^* = 0$ as follows:

$P = I - r_0 \cdot (r_0^T \cdot r_0)^{-1} \cdot r_0^T;$ the expansion equation of the first-order KKT condition in the incremental form is transformed into the parameter changing domain of loads under the case that guarantees the constant locational marginal price as follows:

$S \triangleq \{A \cdot P \cdot \Delta y | x^* + P \Delta y \geq 0, P = I - r_0 \cdot (r_0^T \cdot r_0)^{-1} \cdot r_0^T, \Delta y \in R^n\};$ wherein an operation of the power system is controlled based on results derived from the steps (1) and (2).

* * * * *